United States Patent [19]
Shemwell

[11] Patent Number: 5,287,104
[45] Date of Patent: Feb. 15, 1994

[54] METHOD AND APPARATUS FOR AIDING A LANDING AIRCRAFT

[76] Inventor: David M. Shemwell, 2415 - 42nd Ave. E. Apt 398, Seattle, Wash. 98112

[21] Appl. No.: 778,325

[22] Filed: Oct. 16, 1991

[51] Int. Cl.$^5$ ............................ B64F 1/20; G08G 5/00
[52] U.S. Cl. ............................ 340/952; 340/951; 340/953; 340/955; 340/956; 340/555; 340/557; 342/33; 342/54
[58] Field of Search ............... 340/952, 951, 955, 958, 340/555, 556, 557, 956; 342/33-35, 52-54; 359/298

[56] References Cited

U.S. PATENT DOCUMENTS

| | | |
|---|---|---|
| 3,279,406 | 10/1966 | Ricketts et al. ............ 340/955 |
| 3,377,617 | 4/1968 | Projector ................... 340/955 |
| 4,064,424 | 12/1977 | Hergenrother .............. 340/955 |
| 4,170,767 | 10/1979 | Tanner ...................... 340/955 |
| 4,209,768 | 6/1980 | Basov et al. ................ 340/955 |

FOREIGN PATENT DOCUMENTS

2423832  12/1979  France ................... 340/955

*Primary Examiner*—Donnie L. Crosland
*Attorney, Agent, or Firm*—Graybeal Jackson Haley & Johnson

[57] ABSTRACT

A method and apparatus for aiding a landing aircraft. Three differently-colored beams of laser light are produced and transmitted, one of the beams of laser light being transmitted in a plane containing the direction from which the aircraft is approaching. Another of the beams of light is transmitted on one side of the plane, and the third of the beams of light is transmit on the other side of the plane. The pilot of the aircraft can determine whether the aircraft is on the plane or to the one side or the other by the color of the light the pilot receives. If desired, at least one of the colored laser beams that is transmitted toward one side of the plane can be broken into a plurality of adjacent fan-shaped beams, the light in at least one of the fan-shaped beams being interrupted intermittently.

49 Claims, 6 Drawing Sheets

METHOD AND APPARATUS FOR AIDING A LANDING AIRCRAFT

TECHNICAL FIELD

The present invention relates to aircraft landing systems, and more particularly to a method and apparatus for directing an aircraft along a predetermined trajectory terminating at a desired landing area.

BACKGROUND OF THE INVENTION

Landing an aircraft requires intense concentration to establish proper coordination of the aircraft controls. One of the most important aspects of landing an aircraft is to ensure that the aircraft is properly aligned with the landing area. This typically involves two separate activities. One activity is to assure that the aircraft is landing over the centerline of the landing area. The other activity is to assure that the aircraft is approaching the landing area at the proper speed and vertical descent angle to prevent stalling the aircraft while still landing at a low velocity.

When the landing area is in sight, an aircraft pilot can generally use visual cues to align the aircraft along the centerline of the landing area and at the right descent angle. Although landing an aircraft visually in daylight is difficult, it is even more difficult at night, when the pilot has fewer visual cues available.

A pilot landing an aircraft at a landing field having conventional visual aids typically flies into a glideslope pattern and follows the glideslope while attempting to maneuver over the centerline extension of the landing area. When a pilot is maneuvering into the glideslope pattern from the side of the landing area, it is somewhat difficult to coordinate the turns so that the aircraft is approximately aligned with the centerline extension when the aircraft intercepts the glideslope. Accordingly, it is desirable to have a method and apparatus for landing an aircraft at a landing area which gives highly accurate cues to the position of an aircraft relative to the landing area's centerline and/or desired glideslope.

One particularly severe landing task is landing an aircraft on a carrier, especially aligning the aircraft with the carrier's landing area centerline. Smaller aircraft landing on carriers must be within twenty feet of the centerline, while the margin is ten feet for aircraft with greater wingspans. Complicating the task of landing an aircraft on a carrier is the fact that modern carriers have a landing deck angled 10 degrees from the ship's centerline. Due to the carrier's motion through the water, the ship's centerline typically moves to the right at about 10 knots.

During the day there are many visual cues that the pilot can use when landing on a carrier. However, during the night the visual cues are largely missing. Only the angled deck is lighted. Nighttime loss of depth perception further increases the pilot's difficulties.

Even on the largest carriers, the angled deck measures only 786 feet by 100 feet. The actual landing area is 120 feet long along the deck by 40 feet wide across the deck. The landing area includes four arresting wires spaced 40 feet apart. Thus, if the pilot is 20 feet above the optimum glideslope, the aircraft will miss the arresting wires and have to make a touch-and-go. If the pilot is 20 feet below the optimum glideslope, the aircraft will crash into the stern end of the carrier.

A landing aircraft approaches a carrier at speeds between 105 and 135 knots. Due to these high approach speeds, high momentum, and relatively slow control response of jet aircraft in the landing configuration, it is possible for a small initial drift of the aircraft from the centerline and glideslope to become a serious and potentially dangerous misalignment to the arresting cables and landing area.

Visual aids have been developed to assist in landing aircraft, especially at night. Other than lighting systems that highlight the outline and centerline of the landing area, these visual systems have been developed to assist in the vertical descent guidance of the aircraft. There are no presently-installed precision centerline systems. The visual aids known in the prior art all require the pilot to exercise judgement, such as attempting to fly over a row of lights designating the centerline extension of the runway or keeping lights designating the runway's outline symmetric.

At present there are two primary vertical guidance systems. These systems are Visual Approach Slope Indicator (VASI) and Precision Approach Path Lighting (PAPI). Both of these systems use sets of red and white lights, placed to the side of the runway, which give patterns indicative of the aircraft's placement relative to the desired glideslope. The VASI system includes two sets of red and white lights, one set placed behind the other relative to the approach direction of an aircraft and to the left of the runway as seen from the landing aircraft. Both sets of lights produce adjacent angularly displaced red and white beams directed toward the landing aircraft. In both sets of lights, the upper segment is colored white and the lower segment is colored red. The elevation angles of the two sets of lights are arranged so that when an aircraft is flying on the desired glideslope, the pilot will see the red segment from the farther set of lights and the white segment from the nearer set of lights. If the aircraft is above the desired glideslope, the pilot will see the upper white segments of both sets of lights. If the aircraft is below the desired glideslope, the pilot will see the red segments of both sets of lights.

In the PAPI system, four sets of lights, each having an upper white segment and a lower red segment, as in VASI, are placed side-by-side to the left of the runway as seen by the landing aircraft. The four sets of lights are pointing toward the landing aircraft, but at different elevation angles. The left-hand set of lights has the highest elevation angle and the right-hand set of lights has the lowest elevation angle. The middle two sets of lights are arranged so that a pilot in an aircraft landing along the desired glideslope will see the red light from the two left-hand sets of lights and the white lights from the two right-hand sets of lights. If the aircraft falls below the desired glideslope, the pilot will see the third set of lights from the left turn from white to red, leaving three red lights and one white light. Falling even farther below the desired glideslope will cause all four sets of lights to turn red, indicating danger. On the other hand, if the aircraft rises above the glideslope, the pilot will see one red light and three white lights at first, and then four white lights if it rises sufficiently far.

Two difficulties with such incandescent visual aids, as well as aids using fluorescent or arc lights, are a lack of spatial coherence and a lack of spectral purity. These difficulties cause the transition of an aircraft between a white segment and a red segment to be somewhat muddled, because the lack of spatial coherence causes the boundaries of the two beams to be imprecisely defined.

There is a significant period in this transition where the color from such a set of lights appears pink, rather than white or red. In addition, atmospheric scattering removes the shorter wavelength, i.e., bluer, light from the white segments of these sets of lights. This causes the white light itself to appear somewhat pinkish, even before it is mixed with the light produced by the red segment of each set. Accordingly, it is desirable to have visual aids that are not subject to these faults.

Carriers are presently equipped with the Fresnel lens optical landing system (FLOLS). FLOLS is stabilized to account for the carrier's motions and has a maximum range of about $\frac{3}{4}$ mile. A pilot using FLOLS sees an amber ball (the "meatball") which is aligned with a row of horizontal green datum lights. When the aircraft is below the desired glideslope, the amber ball appears to be below the datum lights. If the aircraft is somewhat farther below the desired glideslope, the color of the ball changes from amber to red. Below this level, the ball disappears from the bottom of the FLOLS display. While optical glideslope landing systems that are more precise and better stabilized are available, even they are only useful out to a maximum range of $1\frac{1}{4}$ miles. It is desirable to have visual landing aids with a greater useful maximum range.

One way of overcoming many of the difficulties associated with present-day landing systems (especially on carriers) is to transmit laser light. Laser light has a high spatial coherence and great spectral purity. Because of its high spatial coherence, laser light can produce crisp displays which seem to come from a single point source and are easy to detect by peripheral vision. For example, the "fuzziness" associated with the edge of a laser-based display is only about one inch in width at a range of one mile. In addition, lasers can be used to produce more accurate light corridors (to the limits of diffraction), which have been found to be usable at ranges of at least twelve miles. This overcomes the requirement for a pilot to resolve visual aids before they become useful because the pilot needs only to recognize the colors of the light corridor. Further, laser systems are easy to align and the spectral purity of their light makes them easy to distinguish. Also, lasers presently have life expectancies of from 4,000 to 10,000 hours and produce an average luminous intensity of 500 candela, which provides for very long range acquisition of the laser signals. The laser's monochromaticity gives laser beams high color contrast with the surroundings and makes them easy to identify. Their identification is further enhanced by coherent effects which make the laser seem to have a "texture."

Lasers require only low input power. This, with their collimation, increases the covertness of visual landing aids based on lasers. Since the laser light comes from a virtual point source, small exit apertures and small, lightweight optical elements can be used in laser-based visual landing aids.

SUMMARY OF THE INVENTION

According to one aspect, the invention is a signalling system to aid in directing a vehicle along a predetermined trajectory in a glideslope plane terminating at a desired landing area. The glideslope plane has two sides. A second plane is perpendicular to the glideslope plane and intersects the landing area. The signalling system comprises means for producing beams of laser light having first, second and third distinct colors having temporally constant intensities. The system further comprises three means for directing the laser beams of the distinct colors. The three means for directing the laser beams of the distinct colors are located in a third plane parallel to, but separated from, the second plane. The first means directs the beam of laser light having the first distinct color to one side of the glideslope plane. The second means directs the beam of laser light having the second distinct color along the glideslope plane. The third means directs the beam of laser light having the third distinct color to the other side of the glideslope plane. The system further comprises means for causing the intensity of the directed laser light beams having the three distinct colors to decrease with angular separation from the third plane.

In another aspect, the invention is a signalling system to aid in landing a vehicle at a predetermined landing area along a predetermined straight line trajectory. The trajectory is defined by a predetermined glideslope plane having two sides and a centerline plane having two sides and intersecting the glideslope plane. The signalling system comprises a glideslope plane indication system and a centerline indication system. The glideslope plane indication system includes means for producing beams of laser light having first, second and third distinct colors having temporally constant intensities. The glideslope plane indication system further includes first, second and third means for respectively directing the first, second and third colors to one side, along, and to the other side of, the glideslope plane. The first, second and third means are located in a third plane parallel to, but separated from, a second plane which is perpendicular to the glideslope plane. The second means is located in a third plane which is parallel to, but separated from, the second plane.

The centerline indication system includes means for producing beams of laser light having the first, second and third distinct colors having temporally constant intensities. The centerline indication system further includes first, second and third means for respectively directing the beam of laser light having the first, second and third distinct colors to one side of, along and to the other side of the centerline plane. The first, second and third means are located substantially in the centerline plane. The signalling system further comprises means for causing the intensity of the directed laser light beams to decrease with angular separation from the centerline plane. This causes the intensity of the laser light beams at the vehicle to decrease as the vehicle approaches the landing area.

DETAILED DESCRIPTION OF THE INVENTION

Figure 1:
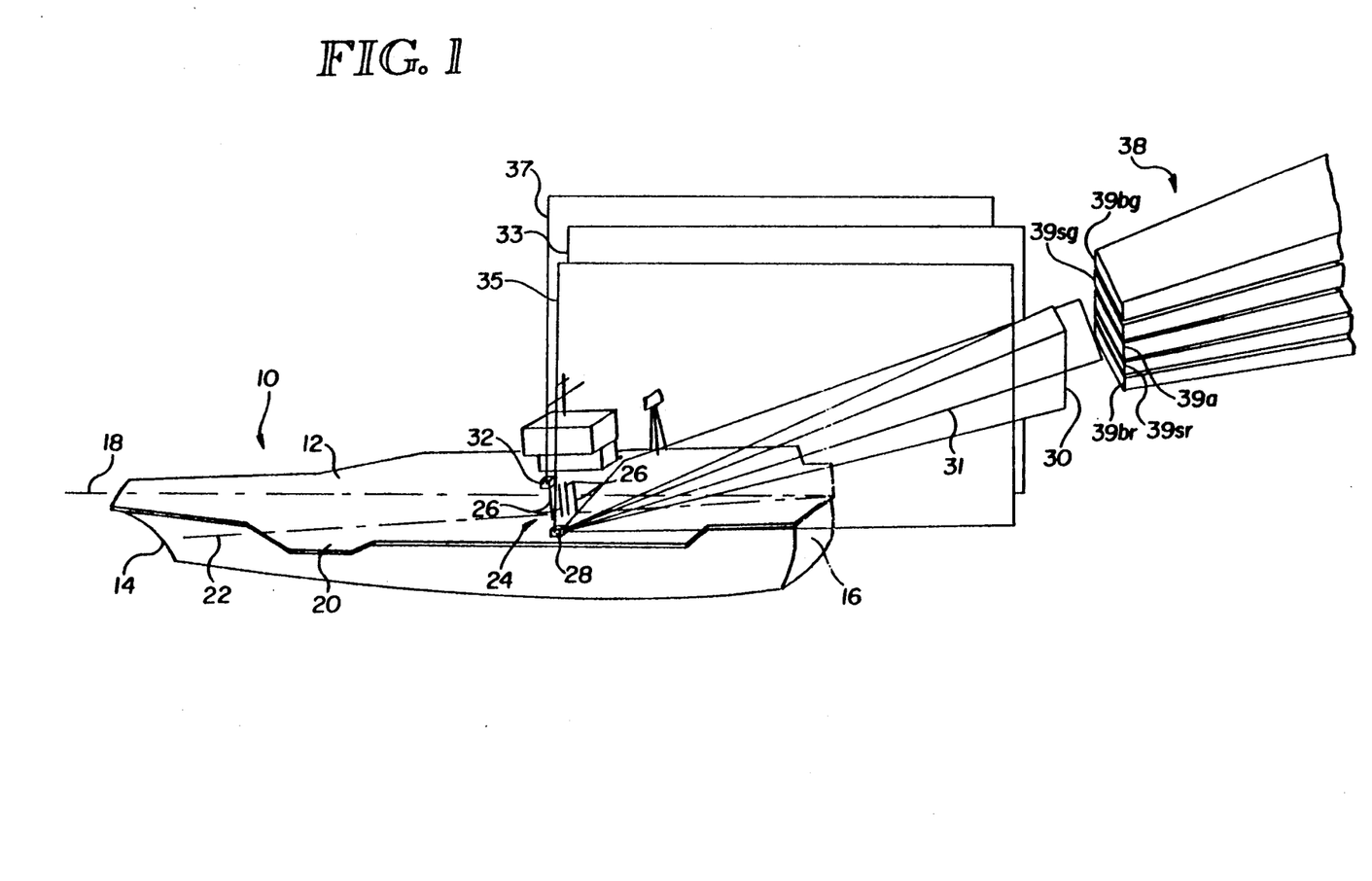
FIG. 1 is a perspective view of a first embodiment of one aspect of the invention.

FIG. 1 is a perspective view of a first embodiment of one aspect of the invention. An aircraft carrier 10 includes a landing deck 12 which extends between the bow 14 and the stern 16 of the carrier 10. A carrier hull centerline 18 also passes between the bow 14 and the stern 16. The landing deck 12 includes an angled portion 20 having a separate angled centerline 22 which extends forward from the stern 16 and to the left of the hull centerline 18 at an angle of approximately ten degrees. The carrier 10 is typically moving forward into the local wind when aircraft are taking off and landing on the landing deck 12. Aircraft which are approaching to land on the carrier 10 attempt to land in a landing area 24 located on the landing deck 12 along the angled centerline 22. These aircraft approach the carrier 10 from its stern 16. A number of arresting wires 26 are placed transversely across the landing area 24 in order to engage the arresting gear on the aircraft. The arresting wires 26 bring the aircraft to a rapid stop. After it has been stopped, the aircraft is detached from the arresting wires 26 and moved away from the landing area 24 so that the landing area 24 will be ready for any further aircraft which are preparing to land in the landing area 24.

The carrier 10 in FIG. 1 is shown with two glideslope visual aids. One, the Fresnel lens optical landing system (FLOLS), is implemented with a Fresnel lens display 28 which is located adjacent and to the port side of the landing area 24. The Fresnel lens display 28 produces a display which shows the "meatball" configuration that carrier aircraft pilots use. In effect, FLOLS defines an angular corridor 30 which fans aftward from the Fresnel lens display 28. The corridor 30 is oriented at an elevation angle of approximately 3 to 4½ degrees (depending on sea state) and is centered about a glideslope plane 31 with respect to the landing deck 12. A second plane 33 is perpendicular to the glideslope plane 31 and passes through the landing area 24. The Fresnel lens display 28 is placed in a third plane 35, which is parallel to, but to the left of, the second plane 33. If an aircraft flies out of the corridor 30 in an upward direction, FLOLS does not produce a significant display. If, however, the aircraft flies out of the corridor 30 in a downward direction, FLOLS provides a visual indication in the form of the "meatball" changing color from amber to red.

The second glideslope visual aid shown on the carrier 10 in FIG. 1 is one aspect of the present invention. The second glideslope visual aid includes a laser beam transmitter 32 located to the right of the landing area 24. The laser beam transmitter 32 is located in a plane 37, which is parallel to, but separated from, the second plane 33. Placing the laser beam transmitter 32 on the opposite side of the landing area 24 from the Fresnel lens display 28 reduces pilot confusion about the identities of the two glideslope visual aids. The laser beams 38 transmitted by the laser beam transmitter 32 project aftward. The laser beam transmitter 32 projects its laser beams 38 in such a way that it defines an array of laser light corridors 39 that is angularly symmetric with respect to the glideslope plane 31. The laser beams projected by the laser beam transmitter 32 extend out to a distance of at least twelve nautical miles. It is possible to provide a baffle in the proximity of the laser beam transmitter 32 to effectively block out the laser beams projected by the laser beam transmitter 32 over the landing deck 24 out to distances of ½ mile. However, a pilot of an aircraft landing at the landing area 24 will not be confused by the presence of the two visual aids since their display 28 and transmitter 32 are located on opposite sides of the landing area 24.

As will be discussed subsequently, the laser beams projected by the laser beam transmitter 32 contain patterns of laser light colors and blinking patterns which identify the angular location of the aircraft with respect to the glideslope plane 31.

Figure 2:
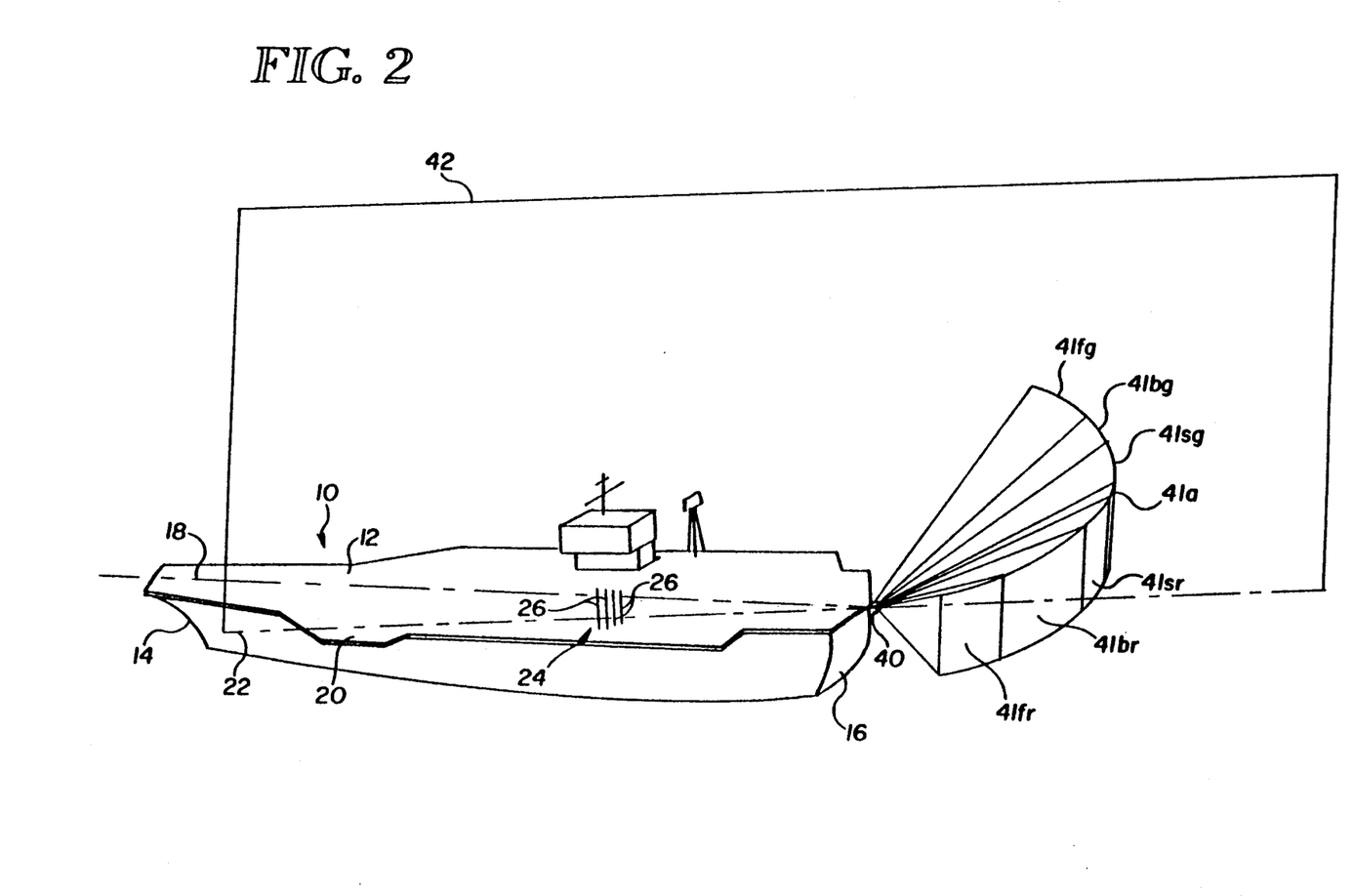
FIG. 2 is a perspective view of a first embodiment of another aspect of the invention.

FIG. 2 is a perspective view of a first embodiment of another aspect of the invention. This aspect of the invention is a centerline localizer system. The centerline localizer system includes a laser beam transmitter 40 located at the stern 16 of the carrier 10, along or just below the angled centerline 22, on a centerline plane 42. The centerline plane 42 is perpendicular to the landing deck 12 and passes through the angled centerline 22. As will be disclosed subsequently, the laser beam transmitter 40 produces an array of fan beams 41 which are projected aftwardly from the stern 16 symmetrically with respect to the centerline plane 42. The fan beams 41 can be seen at distances at least as great as twelve nautical miles. The location of the laser beam transmitter 40 is sufficiently different from the locations of the display 28 and the laser beam transmitter 32 so that a pilot of an aircraft approaching the landing area 24 from the stern 16 of the carrier 10 will easily be able to distinguish the three transmitters on the basis of their relative locations.

Figure 3:
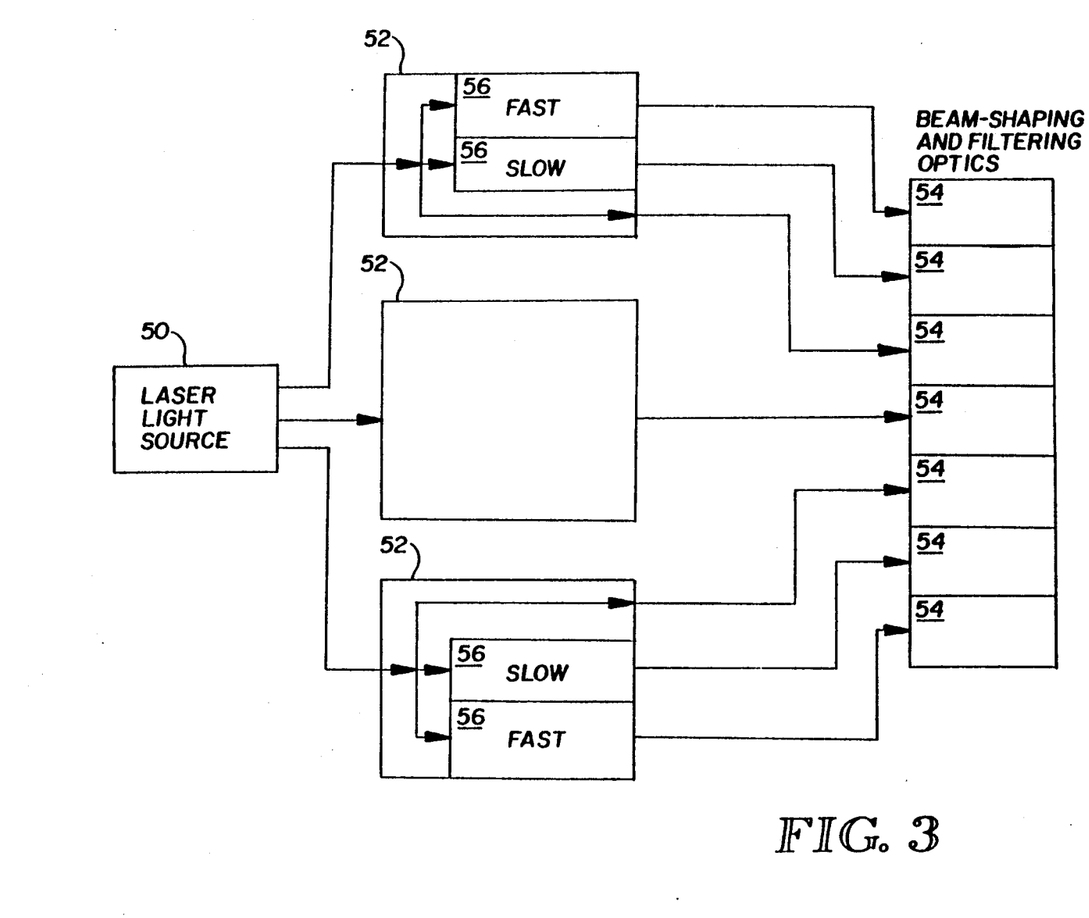
FIG. 3 is a block diagram of a further aspect of the invention.

FIG. 3 is a block diagram of a further aspect of the invention. This aspect of the invention produces, directs, and shapes the laser beams that are projected by the display 28 and the laser beam transmitter 32. This aspect includes a laser light source 50 which includes three lasers respectively capable of producing steady beams of red, amber (or yellow) and green laser light. In one possible embodiment, the red and amber laser light beams are produced by helium neon lasers respectively operating at wavelengths of 633 and 594 nanometers, although other operating wavelengths could be chosen. The green light is produced by an argon laser operating at a 514 nanometer wavelength. Other lasers, such as solid state lasers, could be chosen to produce the lower light beams. The average radiant intensity projected into the beams by the red, amber and green lasers is approximately 1, 0.3 and 0.5 mW per square degree, respectively. Accordingly, the average luminous intensity of the lasers is approximately 500 candelas.

The laser light source 50 is connected to means 52 for directing the beams, through a transmitting channel, such as fiber optic cables or a path through the atmosphere. The beam directing means 52 separately transmits each of the three colored beams to beam shaping and filtering optics 54. In the case of the red and green laser beams, the beam directing means 52 transmits the beams through intermittences generators 56. In one embodiment, the intermittences generators 56 produce slow and fast intermittently interrupted beams. The beams can be transmitted between the various connected means through atmospheric channels or fiber optic channels. In addition, this aspect of the invention also includes an ambient light sensor 58 which senses the amount of ambient light in the vicinity of the beam shaping and filtering optics 54 and produces a control signal which it transmits to the beam shaping and filtering optics 54 laser light source 50 through a cable 58. The beam shaping and filtering optics 54 include apertures, telescopic optics, cylindrical lenses, collimating lenses and telescope defocus optics to produce desired fan-shaped patterns. The beam shaping and filtering optics 54 can also include filters responsive to the control signal on the cable 58. The intermittences are produced by mechanical choppers, such as the solenoid-activated shutters produced by NM Lasers. The solenoids in the shutters are driven by electronics which produce 12 volt pulses having a 35 percent duty cycle. Alternatively, the intermittences can be produced by rotating blades, scanning mirrors, or rotating mirrors.

Figure 4:
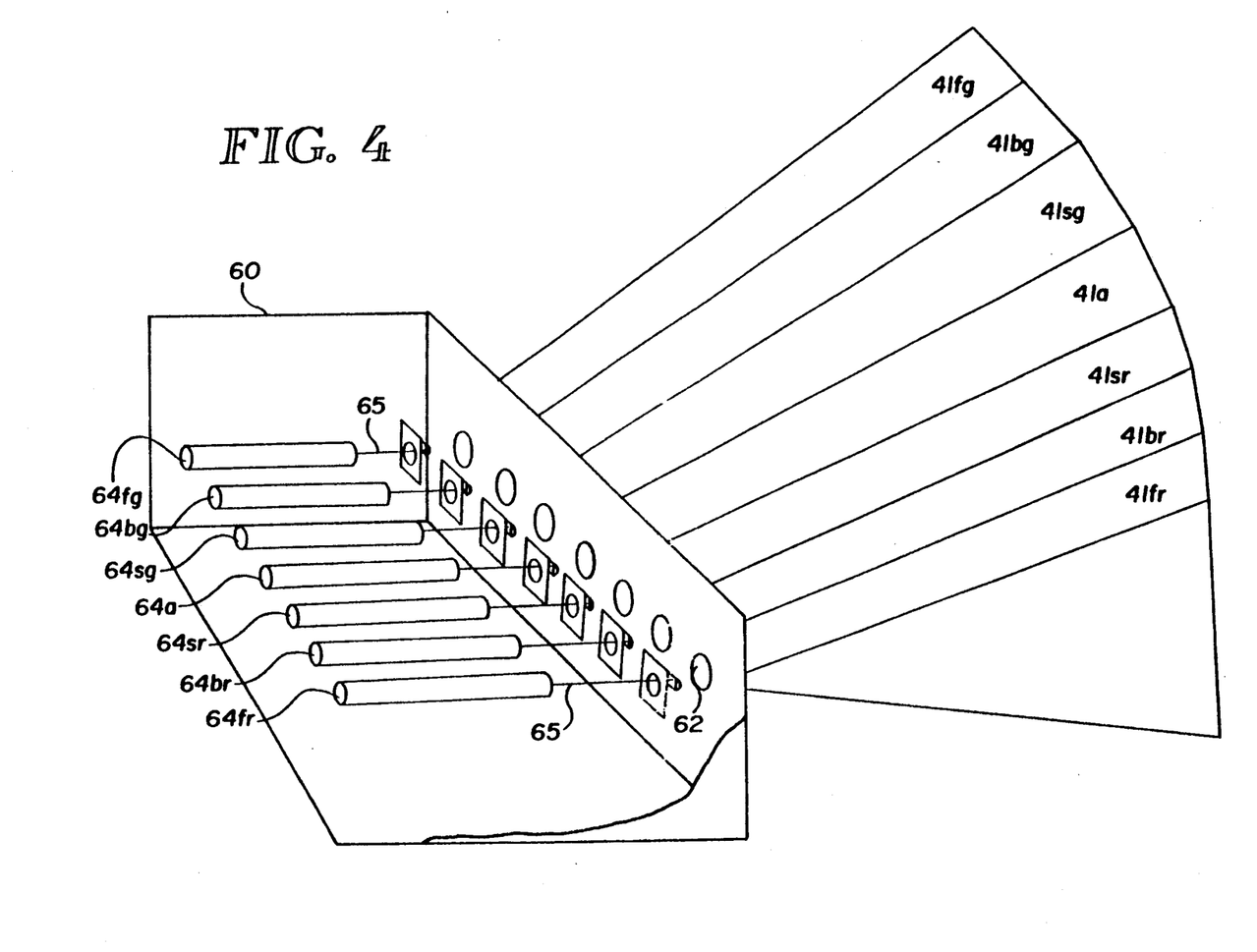
FIG. 4 is a cutaway perspective view of a still further aspect of the invention.

FIG. 4 is a cutaway perspective view of a still further aspect of the invention. In this embodiment, an enclosure 60 has one side with a horizontal array of circular apertures 62. The enclosure 60 also contains an equal number of sources of laser light, such as small gas lasers 64, which are aligned with the apertures 62. Each laser 64 produces a beam 65 of laser light which is directed toward the apertures 62. The light leaving each of the lasers 62 is spatially coherent and collimated. This light passes through a series of optical elements, including a beam shaping aperture, a cylindrical lens and a collimating lens as will be explained subsequently. The beam may also pass through a mechanical chopper or a neutral density filter. The lasers 64 are typically angularly displaced from one another, so that the laser light beams 65 are slightly divergent.

Figure 5:
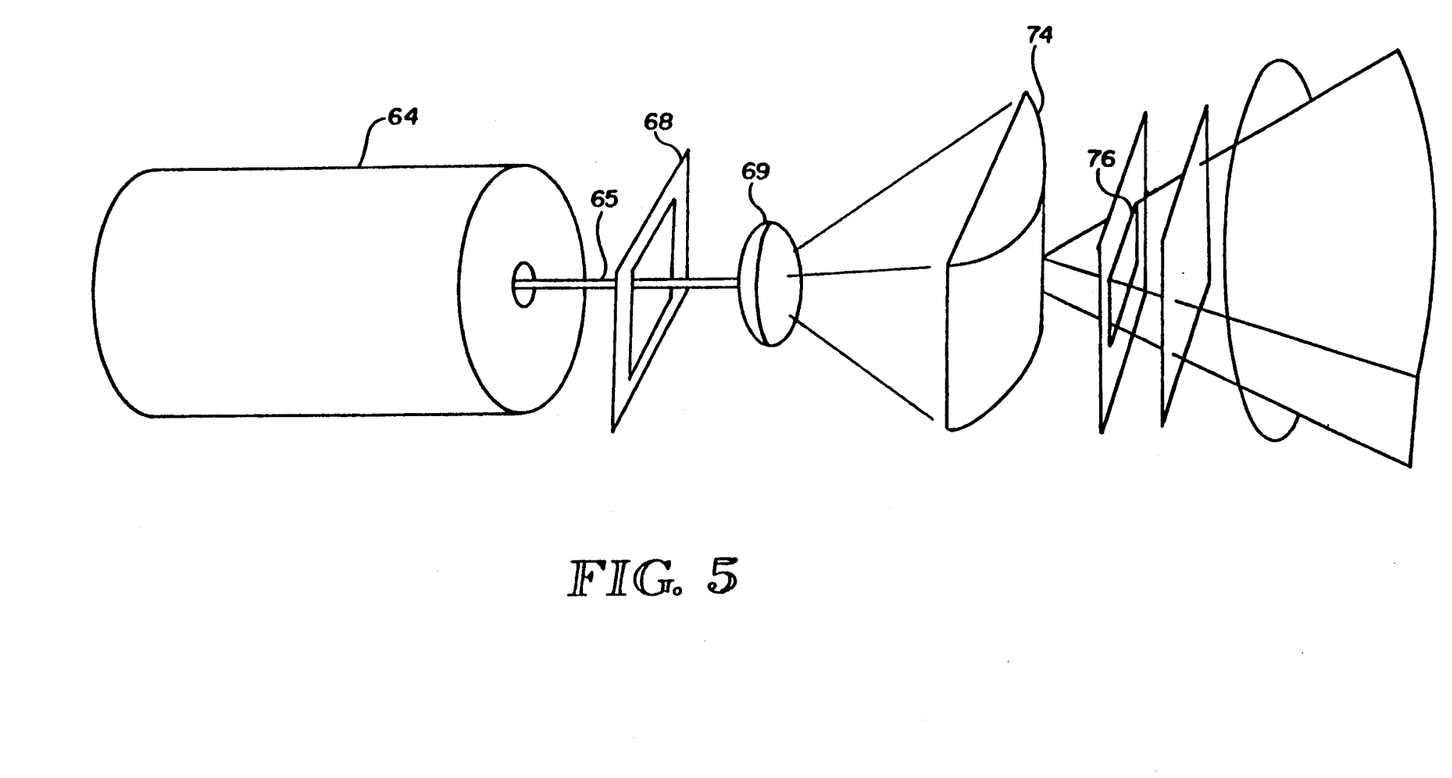
FIG. 5 is a perspective view of a first embodiment of the laser light source of the present invention.

FIG. 5 is a perspective view of a first embodiment of the laser light source of the present invention. The enclosure 60 shown in FIG. 4 typically contains several copies of the laser light source shown in FIG. 5. The laser light beam 65 impinges on the beam-forming aperture 66, which can also include a solenoid-activated shutter 68. The aperture 66 forms the shape of the beam of laser light passing through. The aperture is typically rectangular in shape and produces a beam of light that is longer in one direction than it is in the other. The solenoid-activated shutter 68 periodically closes, thereby preventing any light from passing through the aperture 66. The shutter 68 closes at a rate determined by its conventional driving electronics. Typical rates are between 1 and 10 Hertz. When the shutter 68 is open, the expanded laser light beam 65 passes through to the cylindrical lens 74. The cylindrical lens 74 causes the divergence of the beam 72 to be contracted in the plane perpendicular to the cylindrical axis of the cylindrical lens 74, while allowing the light in the orthogonal plane to pass through the cylindrical lens 74 largely unaffected. In the view of FIG. 5, the vertical dimension of the light beam passing through the cylindrical lens 74 is still slightly divergent, while the horizontal dimension of the light beam passing through the cylindrical lens 74 is reduced. the shaped beam of light passing through the cylindrical lens 74 then passes through the collimating lens 76, which may be placed in an aperture 62 (see FIG. 4).

In one embodiment of the aspect of the invention shown in FIG. 4, seven slightly diverging contiguous fan beams (or corridors) of laser light 80 are produced. The central laser $62_a$ and associated optics can produce a vertically-oriented fan beam of steady amber laser light. The fan beam of amber laser light is 5 degrees high in the vertical plane and between 0.2 and 0.4 degrees wide in the horizontal plane. The beam produced by the laser $64_a$ is not interrupted by a shutter, so it is steady. The laser $64_{sr}$ produces a vertically-oriented fan beam of steady red laser . The fan beam of the red laser light is 5 degrees high in the vertical plane and has a horizontal angle of 0.8 degrees. The laser $64_{br}$ also produces a vertically-oriented beam of red laser light, but this beam is interrupted by a chopper at a slow rate, approximately 50 pulses per minute. The laser $64_{fr}$ also produces a beam of red light, but this beam is interrupted by a chopper at a fast rate, between 3 and 5 Hertz. The laser $64_{sg}$ produces a beam of green light which generates a fan beam of steady green light when it exits through its corresponding aperture 62. The laser $64_{bg}$ produces a green beam which is interrupted at the same slow rate as the beam $64_{br}$. The laser $64_{fg}$ produces a green beam which is interrupted at the same fast rate as the laser $64_{fr}$.

The aspect of the invention shown in FIG. 4 can be placed on the centerline plane 42 of a carrier 10 (see FIG. 1) so that the center of the fan beam 80 produced by the laser $64_a$ is aligned with the centerline plane 42. This will produce a centerline indicator system, where the centerline plane 42 is indicated to the pilot of an aircraft by a steady amber light. If the aircraft moves slightly to the right of the amber section as it approaches the carrier, it will first enter a fan beam of steady green light. As it continues to the right, the aircraft will next enter a fan beam of a slowly-blinking green light. Even further beyond the fan beam of slowly-blinking green light is a fan beam of quickly-blinking green light. To the left of the amber fan beam, the same pattern of interrupted fan beams is produced, except that they are red. These colors comply with the standard code used in navigation, where green means starboard and red means port.

Figure 6:
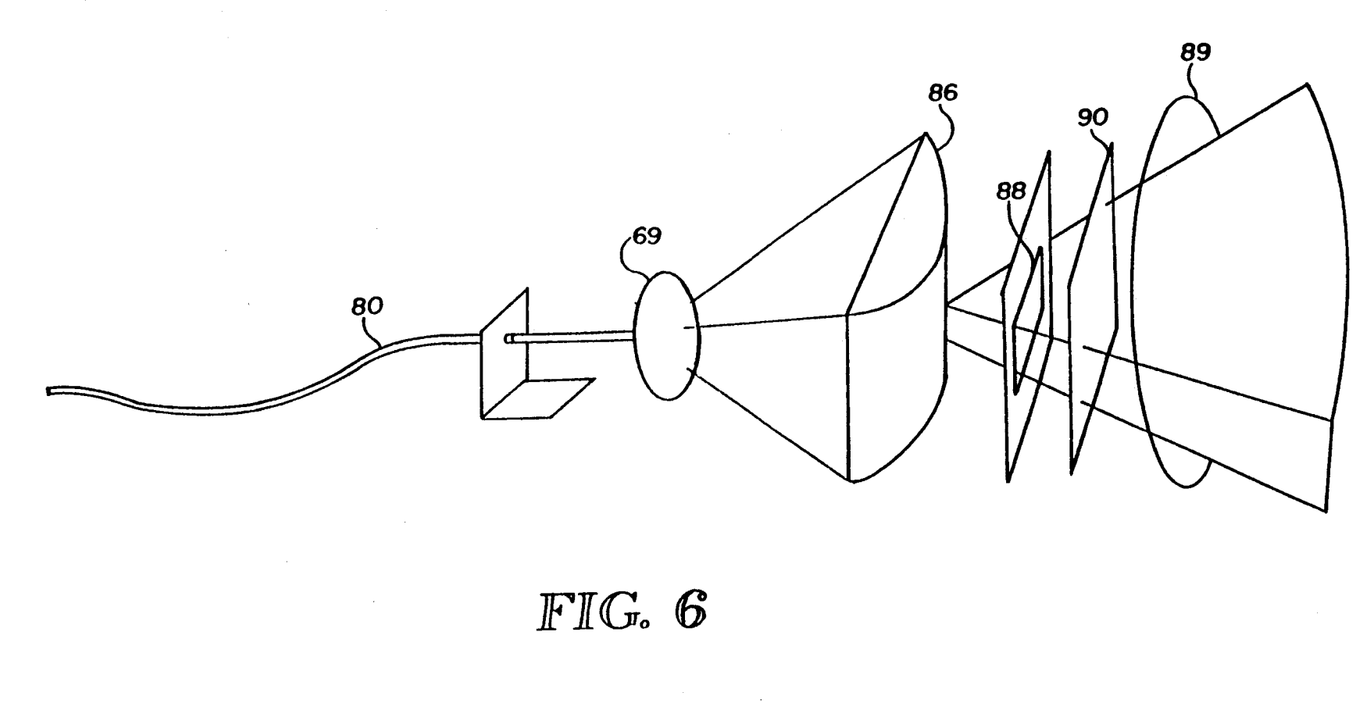
FIG. 6 is a perspective view of a second embodiment of the laser light source of the present invention.

A more compact and better protected piece of visual landing aid equipment can be built using the component shown in FIG. 6. FIG. 6 is a perspective view of a second embodiment of the laser light source of the present invention. In this case, an optical fiber 80 conducts laser light from a source of a particular color of laser light to the end of the optical fiber 80. The light emitting from the optical fiber 80 impinges on the expansion lens 69, which causes it to diverge as it passes toward the cylindrical lens 86. This apertured light beam then passes to a cylindrical lens 86 (which has its cylindrical axis horizontal) to produce a horizontally oriented fan beam from the output of the expander lens 69. The light from the cylindrical lens 86 is shaped into a rectangular beam whose horizontal dimension is greater than its vertical dimension by the mask 88. The light then passes through collimating lens 89. In some cases the light beam passing through the mask 88 passes through a linear-tapered neutral density filter 90 before it reaches the expander lens 89. The apparatus shown in FIG. 6 can be stacked vertically to produce a glideslope indicator system, where the central beam is a steady amber, the fan beams adjoining the central beam above and below are steady green and steady red, and the beams adjoining the respective steady green and steady red beams are blinking green and blinking red beams. The blinking beams can be created by interrupting the laser beams produced by the laser light sources before the light is introduced to the fiber optic 80.

Those skilled in the art will recognize that various modifications of the method and apparatus of the present invention can be made without departing from the spirit and scope of the invention. The scope of the invention is to be determined only by the following claims. In particular, the method and apparatus of the present invention can be applied to situations other than landing an aircraft, for example, maneuvering a craft in space.

I claim:

1. A signalling system to aid in directing a vehicle along a predetermined trajectory defined by the intersection of a glideslope plane and a second plane perpendicular to the glideslope plane, both the glideslope plane and the second plane intersecting a desired landing area, the glideslope plane having two sides, the signalling system comprising:

means for producing beams of laser light having first, second and third distinct colors having temporally constant intensities;

first means for directing the beam of laser light having the first distinct color to one side of the glideslope plane, the first means being substantially located in a third plane parallel to, but separated from, the second plane;

means for causing the intensity of the directed laser light beam having the first distinct color to decrease with angular separation from the third plane;

second means for directing the beam of laser light having the second distinct color substantially along the glideslope plane, the second means being substantially located in the third plane;

means for causing the intensity of the directed laser light beam having the second distinct color to decrease with angular separation from the third plane;

third means for directing the beam of laser light having the third distinct color to the other side of the glideslope plane, the third means being substantially located int he third plane; and means for causing the intensity of the directed laser light beam having the third distinct color to decrease with angular separation from the third plane, whereby the intensities of the laser light beams at the vehicle decrease as the vehicle approaches the landing area substantially along the predetermined trajectory.

2. The signalling system of claim 1 wherein the light intensities of the laser light beams decrease linearly with angular separation of the beams from the third plane.

3. The signalling system of claim 1, further comprising means for adjusting the intensities of the laser light beams as a function of ambient light conditions.

4. The signalling system of claim 1 wherein the means for producing beams of laser light further comprises separate sources for producing the first, second and third distinct colors, the respective sources for producing the first, second and third distinct colors being directly connected to the first, second and third means for directing the beams of laser light.

5. The signalling system of claim 1 wherein the means for producing beams of laser light further comprises separate sources for producing the first, second and third distinct colors and fiber optic cables, the fiber optic cables connecting the sources for producing the first, second and third distinct colors respectively to the first, second and third means for directing the beams of laser light.

6. The signalling system of claim 1 wherein the first distinct color is red, the second distinct color is amber or yellow and the third distinct color is green.

7. The signalling system of claim 1 wherein the laser light having the first distinct color has a wavelength of approximately 633 nanometers, the laser light having the second distinct color has a wavelength of approximately 594 nanometers and the laser light having the third distinct color has a wavelength of approximately 514 nanometers.

8. The signalling system of claim 1 wherein the means for producing beams of laser light comprises one or more diode lasers.

9. The signalling system of claim 1 wherein the means for producing beams of laser light comprises one or more gas lasers.

10. A signalling method to aid in directing a vehicle along a predetermined trajectory defined by the intersection of a glideslope plane and a second plane perpendicular to the glideslope plane, both the glideslope plane and the second plane intersecting a desired landing area, the glideslope plane having two sides, the signalling method comprising the steps of:

(a) producing beams of laser light having first, second and third distinct colors having temporally constant intensities;

(b) directing the beam of laser light having the first distinct color to one side of the glideslope plane;

(c) causing the intensity of the directed laser light beam having the first distinct color to decrease with angular separation from the third plane;

(d) directing the beam of laser light having the second distinct color substantially along the glideslope plane;

(e) causing the intensity of the directed laser light beam having the second distinct color to decrease with angular separation from the third plane;

(f) directing the beam of laser light having the third distinct color to the other side of the glideslope plane; and (g) causing the intensity of the directed laser light beam having the third distinct color to decrease with angular separation from the third plane, whereby the intensities of the laser light beams at the vehicle decrease as the vehicle approaches the landing area substantially along the predetermined trajectory.

11. A signalling system to aid in landing a vehicle at a predetermined landing area along a trajectory in a predetermined glideslope plane, the glideslope plane being perpendicular to a vertical centerline plane and intersecting the landing area, the signalling system comprising:

means for producing beams of laser light having first, second and third distinct colors having temporally constant intensities;

first means located in the proximity of the landing area for forming the beam of laser light having the first distinct color into a first plurality of separate angular fan beams below the glideslope plane, the angular fan beams in the first plurality of angular fan beams being adjacent and angularly displaced int he vertical centerline plane, the light in at least one of the angular fan beams in the first plurality of angular fan beams being interrupted repetitively;

second means located in the proximity of the landing area for forming the beam of laser light having the second distinct color into an angular fan beam substantially along the glideslope plane and adjacent the one of the first plurality of angular fan beams of the laser light having the first distinct color that is closest to the glideslope plane, the second means being located adjacent to the landing area; and third means located int he proximity of the landing area for forming the beam of laser light having the third distinct color into a second plurality of separate angular fan beams above the glideslope plane and adjacent the angular fan beam of the laser light having the second distinct color, the angular fan beams in the second plurality of angular fan beams being adjacent and angularly displaced in the vertical centerline plane, the one of the second plurality of angular fan beams of the laser light having the third distinct color that is closest to the glideslope plane being adjacent the angular fan beam of the laser light having the second distinct color, the light in at least one of the angular fan beams being interrupted repetitively.

12. The signalling system of claim 11 wherein the laser light in the angular fan beams in the first and second pluralities of angular fan beams and in the angular fan beam substantially along the glideslope plane has a light intensity that decreases linearly with angular separation of the angular fan beams from a third plane which is parallel to but displaced from the vertical centerline plane.

13. The signalling system of claim 11, further comprising means for adjusting the intensity of the laser light in the angular fan beams as a function of ambient light conditions.

14. The signalling system of claim 11 wherein the means for producing beams of laser light further comprises separate sources for producing laser light having the first, second and third distinct colors, the respective sources for producing the first, second and third distinct colors being directly connected respectively to the first, second and third means for forming the beams of laser light.

15. The signalling system of claim 11 wherein the means for producing beams of laser light further comprises separate sources for producing laser light having the first, second and third distinct colors and fiber optic cables, the fiber optic cables connecting the sources for producing the laser light having the first, second and third distinct colors respectively to the first, second and third means for forming the beams of laser light.

16. The signalling system of claim 11 wherein the first distinct color is red, the second distinct color is amber or yellow and the third distinct color is green.

17. The signalling system of claim 11 wherein the laser light having the first distinct color has a wavelength of approximately 633 nanometers, the laser light having the second distinct color has a wavelength of approximately 594 nanometers and the laser light having the third distinct color has a wavelength of approximately 514 nanometers.

18. The signalling system of claim 11 wherein the means for producing beams of laser light comprises one or more diode lasers.

19. The signalling system of claim 11 wherein the means for producing beams of laser light comprises one or more gas lasers.

20. The signalling system of claim 11 wherein each of the angular fan beams in the first and second pluralities of angular fan beams is between 0.2 and 0.8 degrees wide in the vertical centerline plane, the angular fan beam substantially along the glideslope plane is not greater than 0.4 degrees wide in the vertical centerline plane, and each of the angular fan beams is approximately 5 degrees wide in width planes perpendicular to the vertical centerline plane.

21. A signalling system to aid in landing a vehicle at a predetermined landing area intersected by a plane having two sides and being in a fixed position relative to the landing area, comprising:

means for producing continuous fan beams of laser light having first, second and third distinct colors;

means for directing the continuous fan beams of laser light having the first distinct color to one side of the plane so that a fan beam of laser light having the first distinct color to one side of the plane completely illuminates the vehicle when the vehicle is on the one side of the plane;

means for interrupting one or more directed fan beam of laser light having the first distinct color;

means for directing the continuous fan beam of laser light having the second distinct color substantially along the plane so that a fan beam of laser light having the second distinct color substantially along the plane completely illuminates the vehicle when the vehicle is substantially along the plane;

means for directing the continuous fan beams of laser light having the third distinct color to the other side of the plane so that a fan beam of laser light having the third distinct color to the other side of the plane completely illuminates the vehicle when the vehicle is on the other side of the plane; and means for interrupting one or more directed fan beams of laser light having the third distinct color.

22. The signalling system of claim 21 wherein the means for interrupting the one or more directed fan beams of laser light having the first color interrupts at least one continuous fan beam at a first rate and at least one other continuous fan beam that is at a greater angular separation from the plane at a second rate, the first rate being greater than the second rate.

23. The signalling system of claim 21, further comprising means for adjusting the intensity of the laser light in the fan beams as a function of ambient light conditions.

24. The signalling system of claim 21 wherein the means for producing beams of laser light further comprises separate sources for producing laser light having the first, second and third distinct colors, the respective sources for producing the first, second and third distinct colors being directly connected respectively to the first, second and third means for directing the beams of laser light.

25. The signalling system of claim 21 wherein the means for producing beams of laser light further comprises separate sources for producing laser light having the first, second and third distinct colors and fiber optic cables, the fiber optic cables connecting the sources for producing the laser light having the first, second and third distinct colors respectively to the first, second and third means for directing the beams of laser light.

26. The signalling system of claim 21 wherein the first distinct color is red, the second distinct color is amber or yellow and the third distinct color is green.

27. The signalling system of claim 21 wherein the laser light having the first distinct color has a wavelength of approximately 633 nanometers, the laser light having the second distinct color has a wavelength of approximately 594 nanometers ad the laser light having the third distinct color has a wavelength of approximately 514 nanometers.

28. The signalling system of claim 21 wherein the means for producing beams of laser light comprises one or more diode lasers.

29. The signalling system of claim 21 wherein the means for producing beams of laser light comprises one or more gas lasers.

30. A signalling method to aid in landing a vehicle at a predetermined landing area intersected by a plane having two sides and being in a fixed position relative to the landing area, comprising the steps of:
(a) producing continuous fan beams of laser light having first, second and third distinct colors;
(b) directing the continuous fan beams of laser light having the first distinct color to one side of the plane so that a fan beam of laser light having the first distinct color to one side of the plane completely illuminates the vehicle when the vehicle is on the one side of the plane;
(c) interrupting one or more directed fan beam of laser light having the first distinct color;
(d) directing the continuous fan beam o laser light having the second distinct color substantially along the plane so that a fan beam o laser light having the second distinct color substantially along the plane completely illuminates the vehicle when the vehicle is substantially along the plane;
(e) directing the continuous fan beams of laser light having the third distinct color to the other side of the plane so that a fan beam of laser light having the third distinct color to the other side of the plane completely illuminates the vehicle when the vehicle is on the other side of the plane; and
(f) interrupting one or more directed fan beams of laser light having the third distinct color.

31. A signalling system to aid in landing a vehicle at a predetermined landing area along a predetermined straight line trajectory, the trajectory being defined by a predetermined glideslope plane having two sides and a centerline plane having two sides and intersecting the glideslope plane, the signalling system comprising:
a glideslope plane indication system, comprising:
means for producing beams of laser light having first, second and third distinct colors having temporally constant intensities;
first means for directing the beam of laser light having the first distinct color to one side of the glideslope plane, the first means being located in a third plane parallel to, but separated from, a second plane which si perpendicular to the glideslope plane;
means for causing the intensity of the directed laser light beam having the first distinct color to decrease with angular separation from the third plane;
second means for directing the beam of laser light having the second distinct color substantially along the glideslope plane, the second means being located in a third plane parallel to, but separated from, the second plane;
means for causing the intensity of the directed laser light beam having the second distinct color to decrease with angular separation from the third plane;
third means for directing the beam of laser light having the third distinct color to the other side of the glideslope plane, the third means being located in the third plane; and
means for causing the intensity of the directed laser light beam having the third distinct color to decrease with angular separation from the third plane, and a centerline indication system, comprising:
means for producing beams of laser light having the first, second and third distinct colors having temporally constant intensities;
first means for directing the beam of laser light having the first distinct color to one side of the centerline plane, the first means being located substantially int he centerline plane;
second means for directing the beam of laser light having the second distinct color substantially along the centerline plane, the second means being located substantially int he centerline plane;
third means for directing the beam of laser light having the third distinct color to the other side of the centerline plane, the third means being located in the fourth plane, whereby the angular position of the vehicle relative to the glideslope plane and the centerline plane is indicated by the colors received at the vehicle from the glideslope plane indication system and the centerline indication system.

32. The signalling system of claim 31, wherein the glideslope plane and centerline plane are mutually perpendicular.

33. The signalling system of claim 31, wherein the glideslope plane indication system further comprises means for adjusting the intensity of the laser light beams as a function of ambient light conditions and the centerline indication system further comprises means for adjusting the intensity of the laser light beams as a function of ambient light conditions.

34. The signalling system of claim 31 wherein both means for producing beams of laser light further comprise separate sources for producing laser light having the first, second and third distinct colors, the respective sources for producing the first, second and third distinct colors being directly connected to the first, second and third means for directing the beams of laser light.

35. The signalling system of claim 31 wherein the means for producing beams of laser light further comprises separate sources for producing laser light having the first, second and third distinct colors and fiber optic cables, the fiber optic cables connecting the sources for producing the laser light having the first, second and third distinct colors respectively to the first, second and third means for directing the beams of laser light.

36. The signalling system of claim 31 wherein the first distinct color is red, the second distinct color is amber or yellow and the third distinct color is green.

37. The signalling system of claim 31 wherein the laser light having the first distinct color has a wavelength of approximately 633 nanometers, the laser light having the second distinct color has a wavelength of approximately 594 nanometers ad the laser light having the third distinct color has a wavelength of approximately 514 nanometers.

38. The signalling system of claim 31 wherein the means for producing beams of laser light comprises one or more diode lasers.

39. The signalling system of claim 31 wherein the means for producing beams of laser light comprises one or more gas lasers.

40. A signalling method to aid in landing a vehicle at a predetermined landing area along a predetermined straight line trajectory, the trajectory being defined by a predetermined glideslope plane having two sides and a centerline plane having two sides and intersecting the glideslope plane, the signalling method comprising:
  a glideslope plane indication method, comprising the steps of:
    (a) locating a source for producing beams of laser light in a third plane parallel to the centerline plane;
    (b) producing beams of laser light from the source for producing beams of laser light, the beams of laser light having first, second and third distinct colors having temporally constant intensities;
    (c) directing the beam of laser light having the first distinct color to one side of the glideslope plane;
    (d) causing the intensity of the directed laser light beam having the first distinct color to decrease with angular separation from the third plane;
    (e) directing the beam of laser light having the second distinct color substantially along the glideslope plane;
    (f) causing the intensity of the directed laser light beam having the second distinct color to decrease with angular separation from the third plane;
    (g) directing the beam of laser light having the third distinct color to the other side of the glideslope plane, the third means being located in the third plane; and
    (h) causing the intensity of the directed laser light beam having the third distinct color to decrease with angular separation from the third plane, and
  a centerline indication method, comprising the steps of:
    (i) producing beams of laser light having fourth, fifth and sixth distinct colors having temporally constant intensities;
    (j) directing the beam of laser light having the fourth distinct color to one side of the centerline plane;
    (k) directing the beam of laser light having the fifth distinct color substantially along the centerline plane; and
    (l) directing the beam of laser light having the sixth distinct color to the other side of the centerline plane, whereby the angular position of the vehicle relative to the glideslope plane and the centerline plane is indicated by the colors received at the vehicle from the glideslope plane indication system and the centerline indication system.

41. A signalling system to aid in assisting a pilot of a vehicle in establishing an intercept over an extended centerline of a predetermined landing area, the extended centerline defining a vertical centerline plane having two sides and intersecting the landing area, the signalling system comprising:
  means for producing beams of laser light having first, second and third distinct colors having temporally constant intensities;
  first means located int he proximity of the landing area for forming the beam of laser light having the first distinct color into a first plurality of separate angular fan beams to one side of the centerline plane, the angular fan beams int he first plurality of separate angular fan beams being adjacent and angularly displaced from the centerline plane, the light in at least two of the angular fan beams int he first plurality of separate angular fan beams being interrupted repetitively at easily distinguishable rates;
  second means located int he proximity of the landing area for forming the beam of laser light having the second distinct color into an angular fan beam substantially along the centerline plane and adjacent the one of the angular fan beams in the first plurality of separate angular fan beams of the laser light having the first distinct color that is closest to the centerline plane, the second means being located adjacent the landing area; ad
  third means located in the proximity of the landing area for forming the beam of laser light having the third distinct color into a second plurality of separate angular fan beams to the other side of the centerline plane and adjacent to the angular fan beam of the laser light having the second distinct color, the angular fan beams in the second plurality of separate angular fan beams being adjacent and angularly displaced from each other and the glideslope plane, the one of the angular fan beams in the second plurality of separate angular fan beams of the laser light having the third distinct color that is closest to the centerline plane being adjacent to the angular fan beam of the laser light having the second distinct color, the light in at least two of the angular fan beams in the second plurality of separate angular fan beams being interrupted repetitively at easily distinguishable rates,
  whereby the pilot of the aircraft will experience a transition from one of the easily distinguishable rates to the other at a position approximately halfway through establishing the intercept over the extended centerline of the landing area.

42. The signalling system of claim 41, further comprising means for adjusting the intensities of the laser light beams as a function of ambient light conditions.

43. The signalling system of claim 41 wherein the means for producing beams of laser light further comprises separate sources for producing the first, second and third distinct colors, the respective sources for producing the first, second and third distinct colors being directly connected to the first, second and third means for directing the beams of laser light.

44. The signalling system of claim 41 wherein the means for producing beams of laser light further comprises separate sources for producing the first, second and third distinct colors and fiber optic cables, the fiber optic cables connecting the sources for producing the first, second and third distinct colors respectively to the first, second and third means for directing the beams of laser light.

45. The signalling system of claim 41 wherein the first distinct color is red, the second distinct color is amber or yellow and the third distinct color is green.

46. The signalling system of claim 41 wherein the laser light having the first distinct color has a wavelength of approximately 633 nanometers, the laser light having the second distinct color has a wavelength of approximately 594 nanometers and the laser light having the third distinct color has a wavelength of approximately 514 nanometers.

47. The signalling system of claim 41 wherein the means for producing beams of laser light comprises one or more diode lasers.

48. The signalling system of claim 41 wherein the means for producing beams of laser light comprises one or more gas lasers.

49. A signalling method to aid in assisting a pilot of a vehicle in establishing an intercept over an extended centerline of a predetermined landing area, the extended centerline defining a vertical centerline plane having two sides and intersecting the landing area, the signalling method comprising the steps of:

(a) producing beams of laser light having first, second and third distinct colors having temporally constant intensities;

(b) forming the beam of laser light having the first distinct color into a first plurality of separate angular fan beams to one side of the centerline plane the angular fan beams being adjacent and angularly displaced from the centerline plane, the light in at lest two of the angular fan beams in the first plurality of separate angular fan beams being interrupted repetitively at easily distinguishable rates;

(c) forming the beam of laser light having the second distinct color into an angular fan beam substantially along the centerline plane and adjacent the one of the angular fan beams int he first plurality of separate angular fan beams of the laser light having the first distinct color that is closest to the centerline plane; and (d) forming the beam of laser light having the third distinct color into a second plurality of separate angular fan beams to the other side of the centerline plane and adjacent the angular fan beam of the laser light having the second distinct color, the angular fan beams in the second plurality of separate angular fan beams being adjacent and angularly displaced from each other and the glideslope plane, the one of the angular fan beams in the second plurality of separate angular fan beams of the laser light having the third distinct color that is closest to the centerline plane being adjacent the angular fan beam of the laser light having the second distinct color, the light in at least tow of the angular fan beams int he second plurality of separate angular fan beams being interrupted repetitively at easily distinguishable rates, whereby the pilot of the aircraft will experience a transition from one of the easily distinguishable rates to the other at a position approximately halfway through establishing the intercept over the extended centerline of the landing area.

* * * * *